Nov. 28, 1961 H. C. OPPEL 3,010,522

BEET HARVESTER

Filed Dec. 29, 1958 8 Sheets-Sheet 1

INVENTOR.

Heinz Carl Oppel

BY Greek Wells

Atty.

Nov. 28, 1961 H. C. OPPEL 3,010,522

BEET HARVESTER

Filed Dec. 29, 1958 8 Sheets-Sheet 2

INVENTOR.

Heinz Carl Oppel

BY

Greek Wells

Atty.

Nov. 28, 1961 H. C. OPPEL 3,010,522

BEET HARVESTER

Filed Dec. 29, 1958 8 Sheets-Sheet 3

INVENTOR.

Heinz Carl Oppel

BY

Greek Wells

Atty.

Nov. 28, 1961 H. C. OPPEL 3,010,522

BEET HARVESTER

Filed Dec. 29, 1958 8 Sheets-Sheet 4

INVENTOR.
Heinz Carl Oppel
BY
Gruck Wells
Atty.

BEET HARVESTER

Filed Dec. 29, 1958 8 Sheets-Sheet 5

INVENTOR.
Heinz Carl Oppel
BY
Greek Wells
Atty.

Nov. 28, 1961 H. C. OPPEL 3,010,522

BEET HARVESTER

Filed Dec. 29, 1958 8 Sheets-Sheet 6

INVENTOR.
Heinz Carl Oppel
BY
[signature]
Atty.

INVENTOR.
HEINZ CARL OPPEL
BY [signature]
Atty.

Nov. 28, 1961 H. C. OPPEL 3,010,522

BEET HARVESTER

Filed Dec. 29, 1958 8 Sheets-Sheet 8

INVENTOR.

HEINZ CARL OPPEL

BY Greek Wells

ATTY.

3,010,522
Patented Nov. 28, 1961

3,010,522

BEET HARVESTER

Heinz Carl Oppel, 212 S. 5th St., Boise, Idaho

Filed Dec. 29, 1958, Ser. No. 784,841
5 Claims. (Cl. 171—58)

The present invention relates to improvements in sugar beet harvesting equipment. This application is a continuation in part of my application Ser. No. 674,729, filed July 29, 1957 for Beet Harvester, now abandoned.

It is the principal purpose of the invention to provide a beet harvesting device operable to lift beets from the ground, clean them of dirt, etc., and elevate them for loading into a transporting vehicle.

Another purpose of the invention is to provide such a device including improved beet lifting wheels having rims thereon providing traction for rotation of the wheels.

A further purpose of the invention is to provide such a device including novel flail means to remove the beets from the wheels and deposit them on the machine for cleaning.

Still another purpose of the invention is to provide an improved cleaning mechanism to separate the beets from clods, etc. and to clean dirt from the beets.

The nature and advantages of the invention will appear more clearly from the following description and the accompanying drawings, wherein a preferred form of the invention is shown. The description and drawings are illustrative only, however, and are not intended to limit the invention except insofar as it is limited by the claims.

Figure 1:
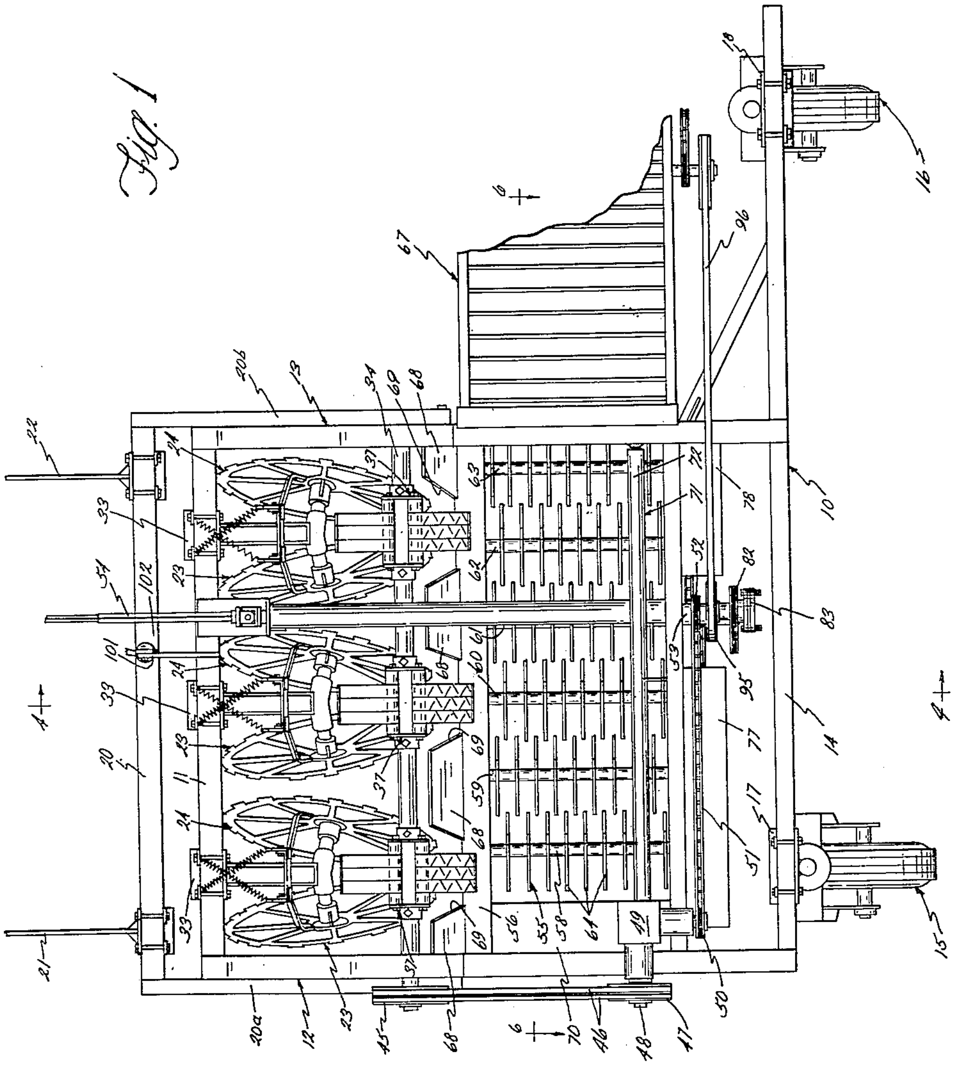
FIGURE 1 is a plan view of a beet harvester embodying my invention.

Referring now to the drawings, and to FIGURES 1–4 in particular, my invention is shown as comprising a main supporting framework 10 which includes a front transverse beam 11, side frames 12 and 13 extending rearwardly therefrom, and a rear transverse beam 14. This main framework 10 carries the several elements which comprise the harvester. The framework 10 is supported at the rear by caster wheels 15 and 16 that are secured by clamps 17 and 18 to the rear transverse beam 14. As illustrated in FIGURE 1, the clamp 17 is secured to the rear edge of the beam 14 and the clamp 18 is secured to the front edge. The wheels 15 and 16 are slidable on the beams 14 when the clamps 17 and 18 are loosened, so as to permit adjustment thereof to match the row spacing of the crop. The front of the framework 10 is supported rigidly to a towing vehicle (not shown) by a tow frame generally indicated at 20. The tow frame 20 is U-shaped, as shown in FIGURE 1, and has rearwardly extending leg portions 20*a* and 20*b* that are pivoted to the side frames 12 and 13 intermediate the front and rear transverse beams 11 and 14. The tow frame 20 also has two forwardly extending draft arms 21 and 22 connected thereto that are adapted to be bolted or otherwise rigidly affixed to the towing vehicle. With this construction, the harvester frame 10 is rigid with the towing vehicle as though it were a part thereof. I have found that this mounting permits easier handling of the implement in the field, and better control of the harvester in short fields and headlands.

Figure 8:
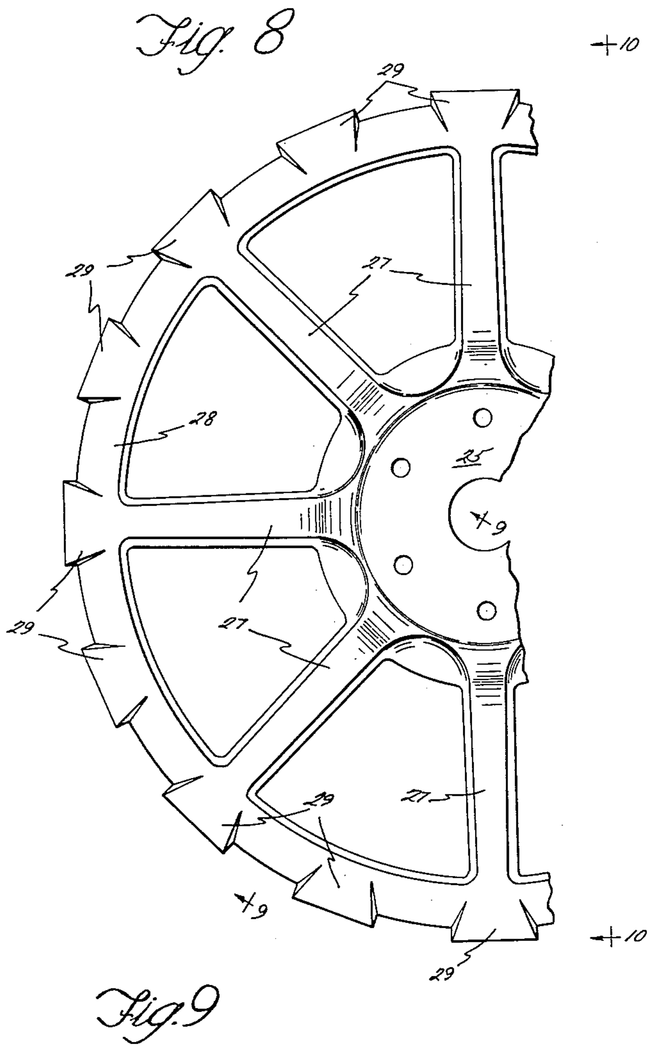
FIGURE 8 is a fragmentary elevation view of a digging wheel.
Figure 10:
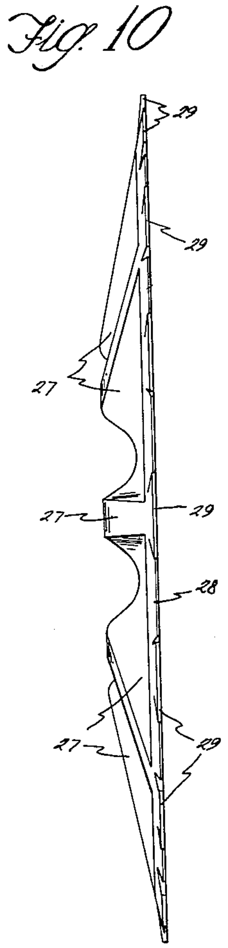
FIGURE 10 is an edge view of the wheel looking in the direction of the arrows 10—10 of FIGURE 8.
Figure 9:
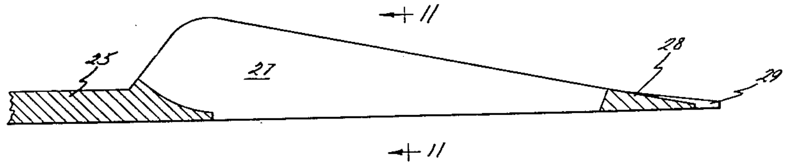
FIGURE 9 is a sectional view taken on the line 9—9 of FIGURE 8.
Figure 11:
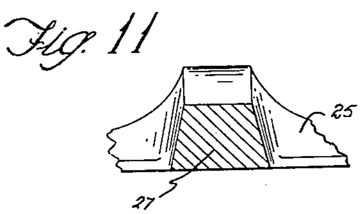
FIGURE 11 is an enlarged fragmentary sectional view taken on the line 11—11 of FIGURE 9.
Figure 12:
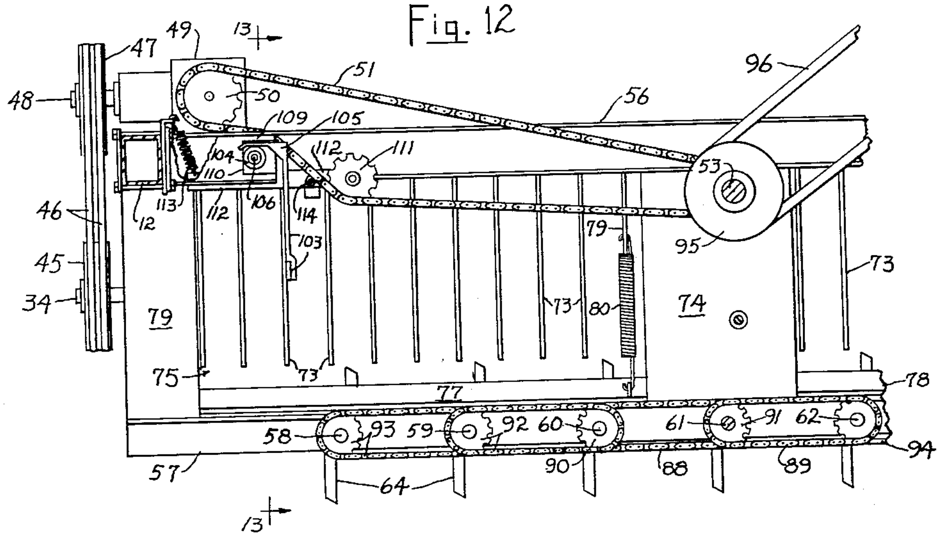
FIGURE 12 is a fragmentary sectional view taken on the line 12—12 of FIGURE 4 and illustrating a modified construction.
Figure 13:
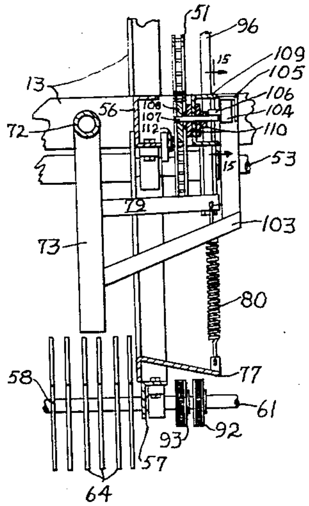
FIGURES 13 and 14 are fragmentary sectional views taken on the line 13—13 of FIGURE 12.
Figure 14:
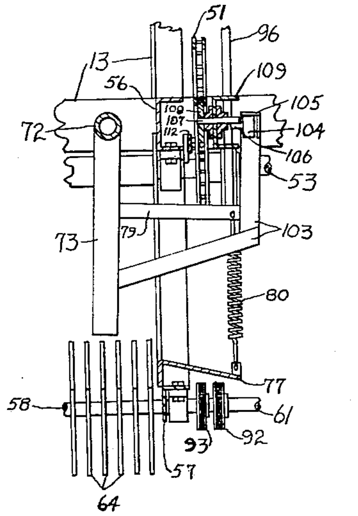
Figure 15:
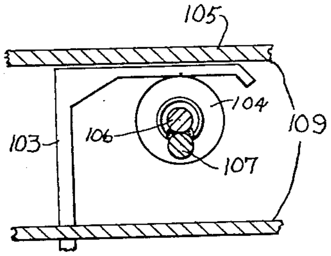
FIGURE 15 is an enlarged fragmentary sectional view taken on the line 15—15 of FIGURE 13.

Directly behind the front transverse beam 11 of the main frame 10, pairs of beet digging wheels 23 and 24 are provided. As shown in FIGURE 1, three pairs of wheels 23 and 24 are provided in the machine illustrated, it being a three row harvester. It will be understood, of course, that a greater or lesser number of wheels 23 and 24 may be provided without departing from the invention, to provide harvesters of various sizes to fit individual needs. The digger wheels 23 and 24 are illustrated best in FIGURES 8, 9, 10 and 11. As shown in these figures, each wheel 23 and 24 includes a central portion 25 having suitable apertures therein through which bolts are extended to secure the wheel 23 or 24 to a hub 26. Radial spokes 27 extend outwardly from the central portion and connect to a rim 28. As illustrated in FIGURE 11, the spokes are trapezoidal in cross section, the inner faces thereof being substantially wider than the outer faces. This construction prevents packing of dirt and rocks between the spokes 27. The spokes 27 also increase in thickness from their outer ends inwardly, to provide strength against breaking when rocks or other hard objects are caught between the wheels 23 and 24. The rim 28 tapers outwardly as shown in FIGURE 9, to provide a substantially narrow outer edge for penetration of the soil. The rim includes a plurality of radial lugs 29 which extend a short distance beyond the periphery of the rim itself. As illustrated in FIGURES 8 and 9, these lugs are somewhat thicker than the body of the rim and project upwardly from the outer face. I have found that a wheel having such a continuous rim 28 with lugs 29 thereon does a better digging and lifting operation, and has better traction with the soil than either the spike wheel type digger, or the digging wheel having an uninterrupted rim.

The hubs 26 to which the digging wheels 23 and 24 are mounted, are journalled on stub shafts 30 and 31 which are carried by rearwardly and downwardly extending standards 32. The details of mounting the wheels 23 and 24 to the stub shafts 30 and 31 will not be described herein, since suitable mounting means for such digging wheels are disclosed in detail in my prior patent No. 2,773,343. Such mounting means are entirely satisfactory for the wheels 23 and 24. The digging wheel supporting standards 32 have clamps 33 at their forward ends by which they are rigidly secured to the front transverse beam 11. When the clamps 33 are loosened, the standards 32 may be adjusted transversely along the beam 11 to match the row spacing in the field from which the beets are harvested.

It will be noted that the stub shafts 31, which carry the wheels 23 and 24, are inclined downwardly and rearwardly so that the wheels 23 and 24 are angularly disposed with respect to the frame 10 and with respect to each other. The point of minimum separation of the wheel rims 28 is spaced rearwardly and upwardly from the point of maximum soil penetration thereof, as has been found necessary to permit the wheels 23 and 24 to properly perform their digging and lifting function. The wheels 23 and 24, being thus disposed, engage and lift beet roots from the soil and elevate them thereabove.

Figure 3:
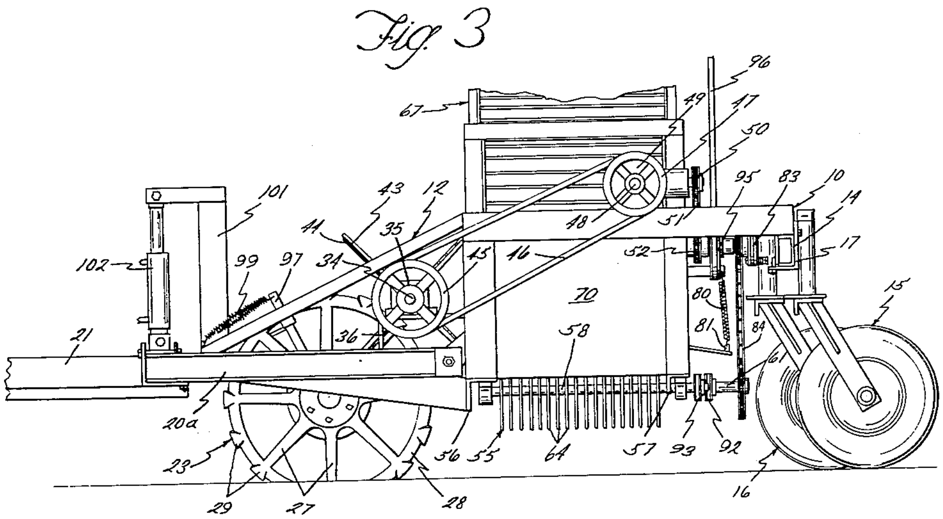
FIGURE 3 is a side elevational view of the machine.
Figure 4:
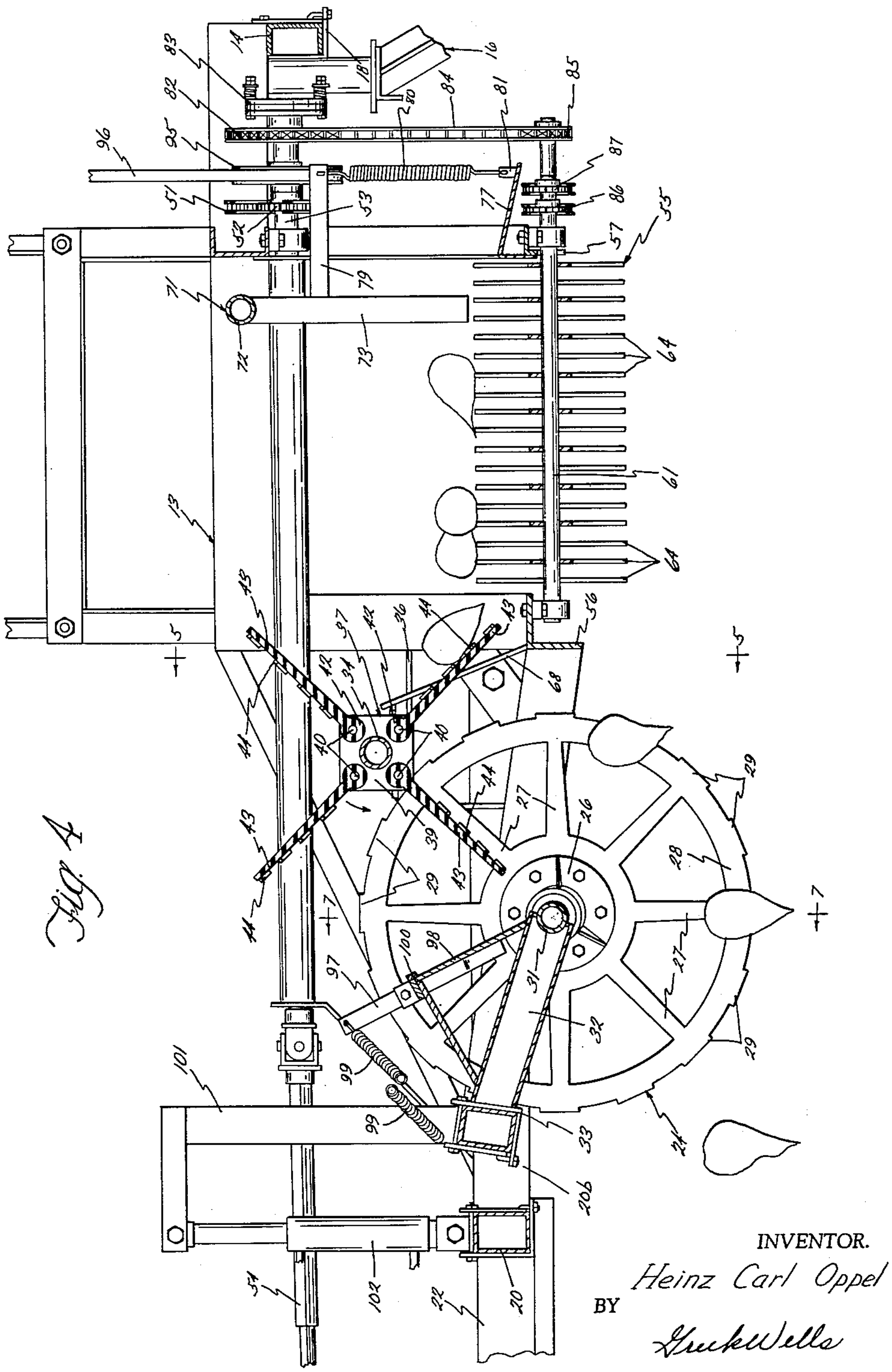
FIGURE 4 is an enlarged longitudinal sectional view taken on the line 4—4 of FIGURE 1.
Figure 5:
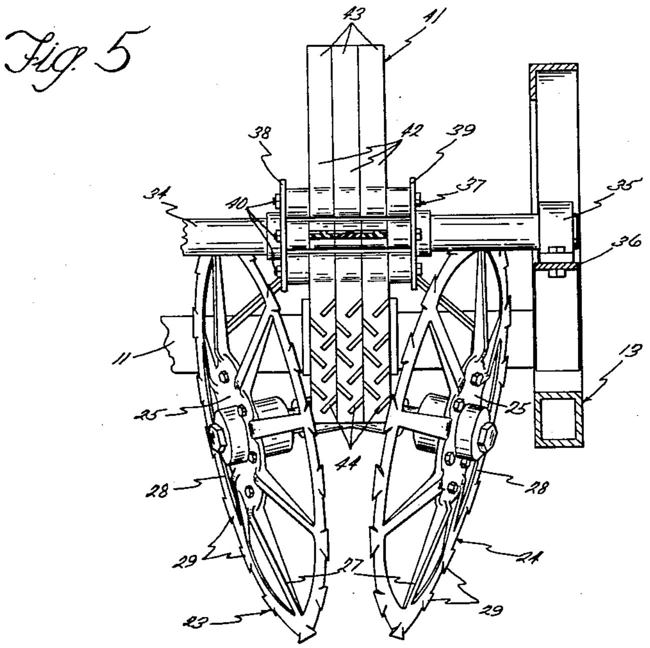
FIGURE 5 is a fragmentary sectional view taken on the line 5—5 of FIGURE 4.

Above the wheels 23 and 24, and substantially tangent to their rearmost edges, a cross shaft 34 is provided. As best shown in FIGURES 3 and 5, the cross shaft 34 is journalled in bearings 35 which are supported on brackets 36 on the side frames 12 and 13. The cross shaft 34 has thereon a plurality of flailing devices generally indicated at 37, there being one flailing device 37 longitudinally aligned with each set of digging wheels 23 and 24. Each flailing device 37 comprises a pair of spaced apart plates 38 and 39 fixed to the shaft 34 in transversely spaced relation. Four pivot pins 40 are connected between the plates 38 and 39, as best shown in FIGURE 4. Each of the pins 40 rotatably mounts a plurality of flexible flails 41, the flails 41 having cylindrical heads 42 and elongated flexible shank portions 43 extending radially therefrom. Three flails 41 are shown on each pin 40 in the drawings. It will be understood, however, that a greater or lesser number may be used depending on harvesting conditions. The shank portions 43 are provided with diagonally extending raised ribs 44 on the leading faces thereof. The cross shaft 34 has a pulley 45 at one end thereof, as shown in FIGURES 1 and 3, which is connected by guide belt means 46 to a drive pulley 47. The pulley 47 is connected to the out-put shaft 48 of a gear box 49. The gear box 49 receives power through a sprocket 50 and chain 51 from a drive sprocket 52 mounted on a forwardly extending main drive shaft 53. The drive shaft 53 extends forwardly and is connected by a universal shaft 54 to the power take-off of the towing vehicle (not shown). The drive mechanism just described rotates the shaft 34 in the direction of the arrow in FIGURE 4, and causes the four groups of flails 41 to be whirled between the wheels 23 and 24 in rapid succession. The flails 41 strike beet roots lodged between the wheels 23 and 24 and carry them rearwardly therefrom. I have found that the flexible flails 41, when whirled rapidly, strike the beet roots with sufficient force to knock most of the dirt therefrom and thus perform a cleaning action as well as dislodging the beets from the digging wheels. The flexibility of the flails 41 prevents undue injury to the beet roots as they are struck.

Figure 6:
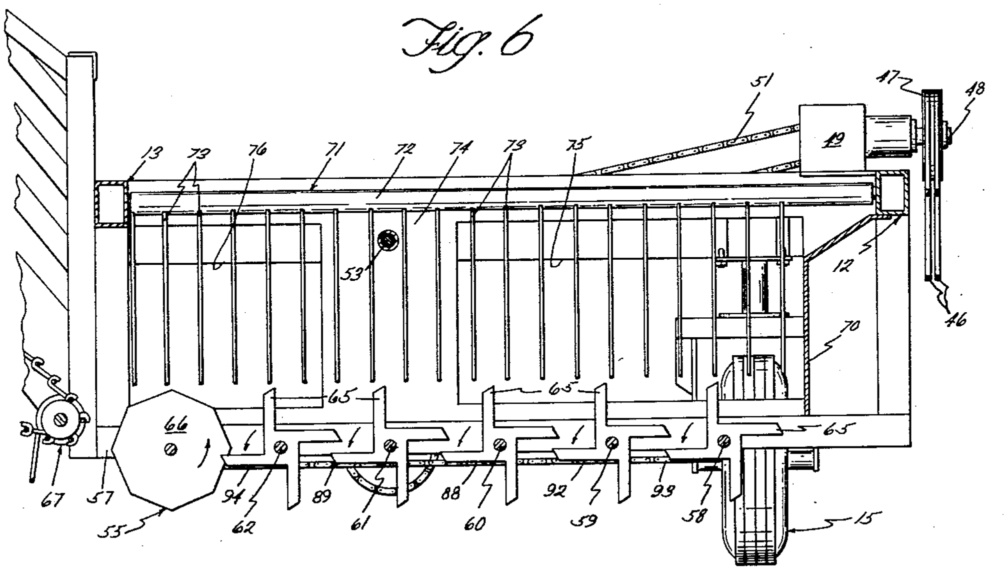
FIGURE 6 is an enlarged sectional view taken substantially on the line 6—6 of FIGURE 1.

Behind the digging wheels 23 and 24, I provide a cleaning device generally indicated at 55 in the drawings. The cleaning device 55 comprises two longitudinally spaced frame members 56 and 57 which extend between the side frames 12 and 13. Longitudinally extending shafts 58, 59, 60, 61, 62 and 63 are provided between the frame members 56 and 57 and are journalled therein. The shafts 58–62 carry toothed rotors 64, commonly known in the industry as rotors. Each of the rotors 64 has a plurality of substantially radially extending teeth 65 thereon. As shown in FIGURE 1, the rotors 64 on adjacent shafts are staggered, and the tips of the teeth 65 pass in close juxtaposition to each other. The shaft 63 carries a plurality of octagonal disks 66, as shown in FIGURE 6. The shafts 58–63 are rotated in the direction of the arrows in FIGURE 6, by means hereinafter described, and beet roots deposited thereon by the flails 44 are moved transversely of the frame 10 by rotation of the rotors 64, at the same time being jostled by the teeth 65 to clean dirt, etc. therefrom. The dirt thus separated from the beet roots drops down between the rotors 64 to the ground. By the time the beet roots reach the disks 66, they have substantially all of the dirt removed therefrom. The disks 66 pass the beet roots onto an elevating conveyor generally indicated at 67 in the drawings, which is positioned at the side of the frame 10 in transverse alignment with the cleaning device 55, just described. The conveyor 67 transports the beet roots upwardly and deposits them in a transporting vehicle, such a truck or a wagon (not shown) which carries them away for processing.

Figure 16:
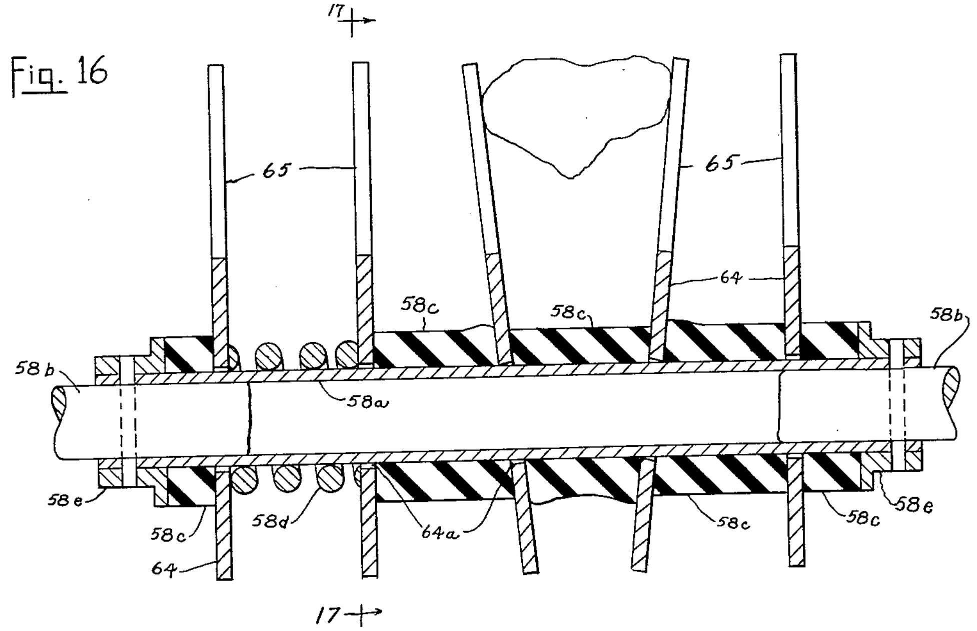
FIGURE 16 is an enlarged sectional view illustrating the preferred form of rotor mounting.
Figure 17:
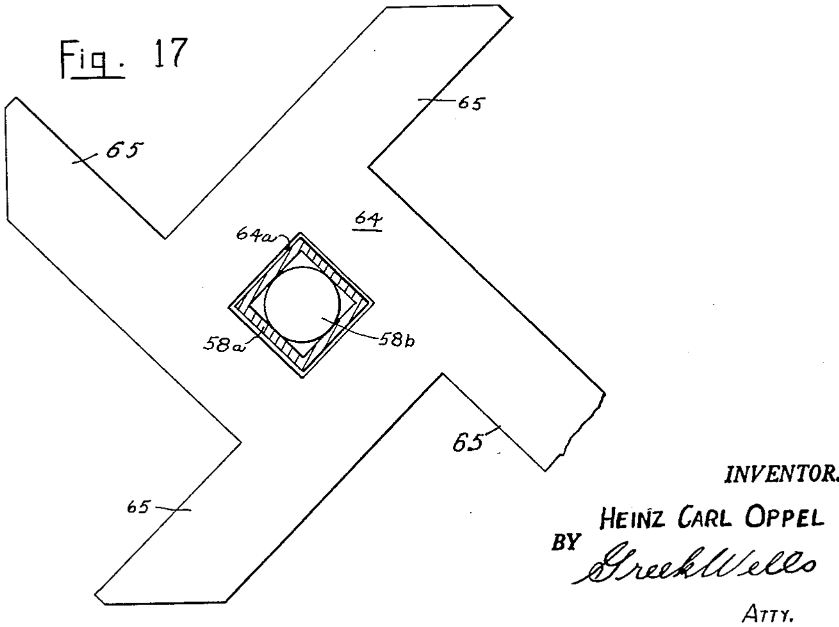
FIGURE 17 is a sectional view taken on the line 17—17 of FIGURE 16.

The individual mounting of the rotors is shown in FIGURES 16 and 17. They are naturally operating under dirty, difficult conditions. Beets are harvested at a time when the soil is apt to be wet too. The rotors 64 are mounted on their respective shafts with provision for their vibration in response to the blows delivered to them by beets that are thrown onto them by the flails 41. The rotor mounting portions of the supporting shafts for the rotors are made square in cross section. As illustrated in FIGURE 16, the shaft 58 is made up of a square tube 58*a* pinned to round shaft portions 58*b* that may extend any desired amount into the tube 58*a*. The rotors 64 have square central apertures 64*a* that are slightly larger than the exterior of the tube 58*a* so they can rock on the tube. Between the several rotors resilient spacers 58*c* and 58*d* are placed around the tube 58*a* and compressed enough to hold the rotors 64 in spaced parallel relation. These resilient spacers may be made of any suitable form just so they will yield to allow the rotors to rock on the tube 58*a*. As shown, they are rubber tubes 58*c* and coiled springs 58*d*. They might all be alike and of some other resilient material. They serve to provide yielding lateral support for the rotors tending to keep them parallel and in planes perpendicular to their shafts. Furthermore, they provide for vibration of the rotors 64 so as to shake off the dirt and trash that tend to collect between rotors and on them. In case a rock gets caught betwen two adjacent rotors as shown in FIGURE 16, the rotors can yield until the rotor on the adjacent shaft strikes the rock and works it loose or it is thrown out beneath the rotors. The end rotors are held in place by collars 58*e*, held in place by the same pins that hold the sleeve 58*a* on the shaft portions 58*b*.

With this rotor construction the flails 41 cooperate to set up enough rotor vibration to keep the rotors from clogging. Better cleaning of the beets is also accomplished.

On the frame member 56 in front of the cleaning device 55, an upright barrier 68 is provided to confine the beet roots on the cleaning device 55 as they are moved toward the elevating conveyor 67. The barrier 68 has notches 69 therein aligned with the wheels 23 and 24 to permit the flailing devices 37 to carry the roots from the wheels 23 and 24 onto the cleaning device 55. As shown in FIGURE 6, a barrier plate 70 is provided on the side frame 12 adjacent the shaft 58, to assist in confining the beet roots on the cleaning device 55. At the rear of the cleaning device 55, a novel pivoted grate 71 is provided. The grate 71 comprises a cross rod 72 pivotally supported between the side frames 12 and 13 above the cleaning device 55 and a plurality of spaced apart vertical bars 73 depending from the cross rod 72. The bars 73 terminate a short distance above the rotors 64, and provide a barrier to prevent beet roots from falling from the rear edge of the cleaning device 55. Immediately behind the pivoted grate 71, a rear wall 74 is provided which extends upwardly from the transverse frame member 57. The rear wall 74 has openings 75 and 76 therein. At the bottom of each opening 75 and 76, the rear wall 74 has rearwardly and downwardly extending sills 77 and 78. One of the vertical bars 73 of the grate 71 has a rearwardly projecting finger 79 fixed thereon. The finger 79 is connected by a coil spring 80 to a lug 81 mounted on the sill 77. The spring 80 yieldingly maintains the pivoted grate 71 in vertical position, and resists rearward swinging thereof. As the whirling, flailing devices 37 dislodge beet roots from between the wheels 23 and 24 and throw them rearwardly, the grate 71 catches the beet roots and drops them onto the cleaning device 55. Any clods or dirt which are lodged between the wheels 23 and 24 that do not disintegrate when struck by the flailing devices 37 are thrown against the grate 71 and broken up. The broken clods then either pass through the openings 75 and 76 in the rear wall 74, or drop through the rotors 64 to the ground. The grate 71 thus serves a dual purpose of catching the beet roots as they are thrown rearwardly by the flailing devices 37, and also breaking up any clods that are picked up by the wheels 23 and 24.

Figure 2:
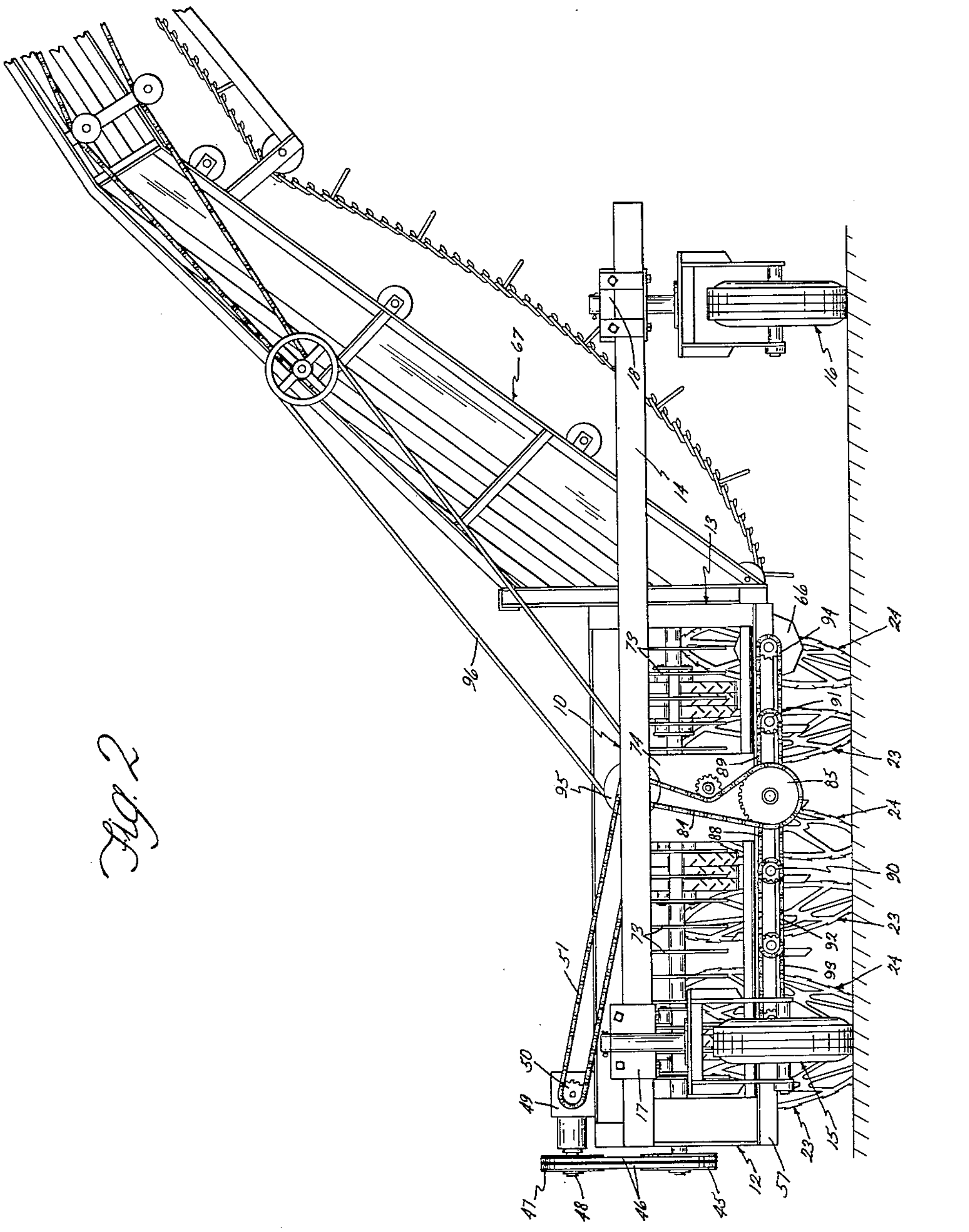
FIGURE 2 is a rear elevational view of the machine.

As illustrated best in FIGURES 2 and 4, the rotor shafts 58–63 are driven from a main power shaft 53. The shaft 53 has a drive sprocket 82 thereon which is driven from the shaft 53 through a slip clutch 83. The drive sprocket 82 has a drive chain 84 thereon which is connected to a sprocket 85 on the rotor shaft 61. With this construction, rotation of the shaft 53 is transmitted through the drive sprocket 82, the chain 84, and the sprocket 85 to the rotor shaft 61. The shaft 61 has a pair of sprockets 86 and 87 thereon, which through chains 88 and 89, drives sprockets 90 and 91 fixed to the adjacent shafts 60 and 62. The rotor shaft 60 drives the shaft 59 through sprocket and chain means 92. The shaft 59 in turn drives the shaft 58 through sprocket and chain means 93. The shaft 62 drives the shaft 63 through sprocket and chain means 94. Each of the shafts 58–63 are thus driven in the same direction and at the same speed by the shaft 61. Power for the elevating conveyor 67 is provided from the power shaft 53 through a pulley 95 and a belt 96.

Figure 7:
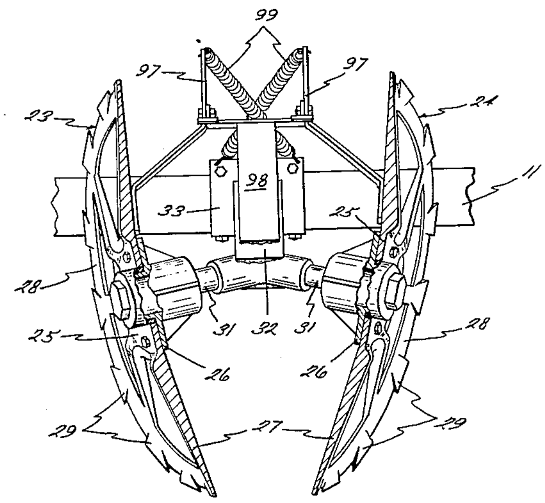
FIGURE 7 is a fragmentary sectional view taken on the line 7—7 of FIGURE 4.

One of the greatest problems to be overcome in beet harvesters of this type is the problem of dirt and mud accumulation on the machine and particularly on the digging wheels 23 and 24. This problem is quite serious, especially when the soil is moist and packs easily. As hereinbefore described, my improved wheels 23 and 24 do not readily lend themselves to soil accumulation due to their unique construction. Also the rapidly whirling flails 41 which brush against the rims 28 of the wheels 23 and 24 keep the rims 28 free of clods and dirt accumulation. The only place that dirt can accumulate on the wheels 23 and 24 is in the central portions 25 around the hubs 26. To keep these portions free of dirt accumulation, I provide novel scrapers 97. As illustrated best in FIGURES 1, 4 and 7, the scrapers 97 are pivoted to brackets 98 supported on the standards 32 which support the wheels 23 and 24. Each of the scrapers 97 has a spring 99 which extends forwardly therefrom to the clamp means 33 at the forward end of the standard 32. The springs 99 normally hold the scrapers 97 against stop bars 100 mounted on the bracket 98 but allow the scrapers 97 to yield forwardly to pass any rocks or clods that may be wedged tightly in the wheels 23 and 24 so that jamming or breakage is prevented.

I have found that a device constructed in accordance with my invention as hereinbefore described operates easily and efficiently to dig, clean and load beets. The main frame 10 of the harvester being rigidly mounted to the towing vehicle, and supported at the rear by the caster wheels 15 and 16 is easily handled in the field for best results. The construction and mounting of the wheels 23 and 24 to the frame 10 permits the wheels to travel along the beet rows smoothly to dig and elevate the roots without undue injury, and without sliding or clogging. The wheels 23 and 24 may be readily adjusted to the proper digging depth by angular adjustment of the main frame 10 with respect to the tow frame 20. As illustrated best in FIGURE 4, the main frame 10 has an inverted L-shaped bracket 101 thereon which is rigidly connected to the tow bar 20 by means of an hydraulic cylinder 102 to support the frame 10 at the proper level. By vertical adjustment of the cylinder 102 the digging level may be changed.

In FIGURES 12–15 of the drawings, I have shown a modified construction wherein the grate 71 is power actuated so as to keep the bars 73 in a state of activity at all times. For bad soil conditions that produce excessively dirty beets this has been found to be advisable. The modification consists of an L-shaped arm 103 that is fixed to one of the bars 73 near the gear box 49 and mechanism driven by the sprocket chain 51 for imparting an oscillating motion to the arm 103. The arm 103 extends rearwardly through the opening 75, then upwardly to a roller 104. The arm 103 has a laterally extended portion 105 that rides on the roller 104. The roller 104 is journalled on an axle 106 that is secured on a shaft 107 and eccentrically mounted thereon. Rotation of the shaft 107 thus causes the roller 104 to move the arm 103 up to the position shown in FIGURES 13 and 15, then allows it to drop to the position shown in FIGURE 14. The spring 80 urges all of the bars 73 toward the position shown in FIGURE 14 and opposes lifting of the arm 103 by the roller 104.

The shaft 107 is driven from the chain 51 by a sprocket wheel 108. A channel shaped frame member 109 is mounted on the side frame 12 and supports bearings 110 for the shaft 107. The chain 51 is held against the wheel 108 by an idler sprocket wheel 111. The wheel 111 is carried by an arm 112 that is pivoted on the frame member 56 at 114 and is urged by a spring 113 in a direction to press the idler wheel 111 down on the chain 51. With this modification the cross rod 72 and the bars 73 carried thereby, are kept moving all the time. The spring 80 moves the bars 73 forward against the crop being thrown against them and the driven roller 104 moves the bars 73 rearwardly.

My novel combination of flexible flails 41 with the wheels 23 and 24, in place of the standard paddle or reel assembly provides for more efficient removal of the beets from the wheels 23 and 24 without injury to the beets, and also provides a cleaning action, thus assisting the rotor cleaning device 55. The flexible flails 41 also serve to maintain the rims 28 of the wheels 23 and 24 clear of dirt and clods. My novel spring loaded pivoted grate 71 at the rear of the cleaning device 55, catches the beets as they are flung rearwardly and cushions their fall onto the rotors 64, as well as disintegrating clods and the like which may accompany the beets, and allowing the dirt to spray out through the apertures 75 and 76 in the rear wall 74.

It should be apparent from the foregoing that my improved sugar beet harvester successfully digs, cleans and elevates beets for loading in even the most adverse circumstances, always producing clean, dirt free beets even in those cases where harvesting must be carried on in wet muddy fields.

Having thus described my invention, I claim:

1. A beet harvester comprising a mobile frame, a pair of forwardly diverging beet digging and elevating wheels pivotally mounted to said frame, a rotatable flailing device mounted for rotation on said frame rearwardly and upwardly of said digging and elevating wheels, said flailing device having rubber-like flexible, pivoted flails extending between said digging and elevating wheels inward substantially beyond the peripheries thereof, said flails upon rotation of said flailing device serving to strike beets between the wheels and remove them rearwardly from between the wheels.

2. The device defined in claim 1 wherein the wheels have rims tapering in thickness to a thin peripheral edge, and each rim has lugs thereon spaced peripherally about the rim and extending radially beyond the outer peripheral edge thereof, said lugs being thicker than the rim.

3. The device defined in claim 1 wherein the wheels have rims tapering in thickness to a thin peripheral edge, and each rim has lugs thereon spaced peripherally about the rim and extending radially beyond the outer peripheral edge thereof, said lugs being thicker than the rim, and that surface of each lug which faces toward the other wheel being coplanar with the corresponding face of the rim.

4. The device defined in claim 1 wherein the mobile frame also has a plurality of transversely spaced shafts rotatably mounted thereon behind the wheels and extending rearwardly therefrom, certain of said shafts having a plurality of spaced apart toothed disks nonrotatably mounted thereon receiving the beets from said flailing device and, upon rotation of said shafts, serving to jostle the beets and move them across the frame toward one edge thereof, said shafts having resilient spacers thereon yieldably holding the disks apart.

5. The device defined in claim 1 wherein the mobile frame also has a plurality of transversely spaced shafts rotatably mounted thereon behind the wheels and extending rearwardly therefrom, certain of said shafts having a plurality of spaced apart toothed disks nonrotatably mounted thereon receiving the beets from said flailing device and, upon rotation of said shafts, serving to jostle the beets and move them across the frame toward one edge thereof, said shafts having resilient spacers thereon yieldably holding the disks apart, and said frame has an upright grate extending above said shafts adjacent to the rearmost disks thereon, said grate being swingably suspended from the frame to yield under impact of beets thrown rearwardly over the disks by said flailing device.

References Cited in the file of this patent

UNITED STATES PATENTS

| | | |
|---|---|---|
| 1,524,360 | Lauritzen | Jan. 27, 1925 |
| 2,365,540 | Fonken | Dec. 19, 1944 |
| 2,595,340 | Diethelm | May 6, 1952 |
| 2,637,964 | Orendorff | May 12, 1953 |
| 2,682,739 | Bozeman et al. | July 6, 1954 |
| 2,688,222 | Sorensen et al. | Sept. 7, 1954 |
| 2,773,343 | Oppel | Dec. 11, 1956 |

FOREIGN PATENTS

| | | |
|---|---|---|
| 421,776 | France | Jan. 4, 1911 |
| 414,459 | Germany | June 5, 1925 |
| 261,878 | Great Britain | Dec. 2, 1926 |